E. S. HUTTON.
GLASS MOLD.
APPLICATION FILED FEB. 12, 1916.

1,253,246.

Patented Jan. 15, 1918.
2 SHEETS—SHEET 1.

WITNESSES:

INVENTOR
EDWARD S. HUTTON.
BY
Lockwood & Lockwood
ATTORNEYS

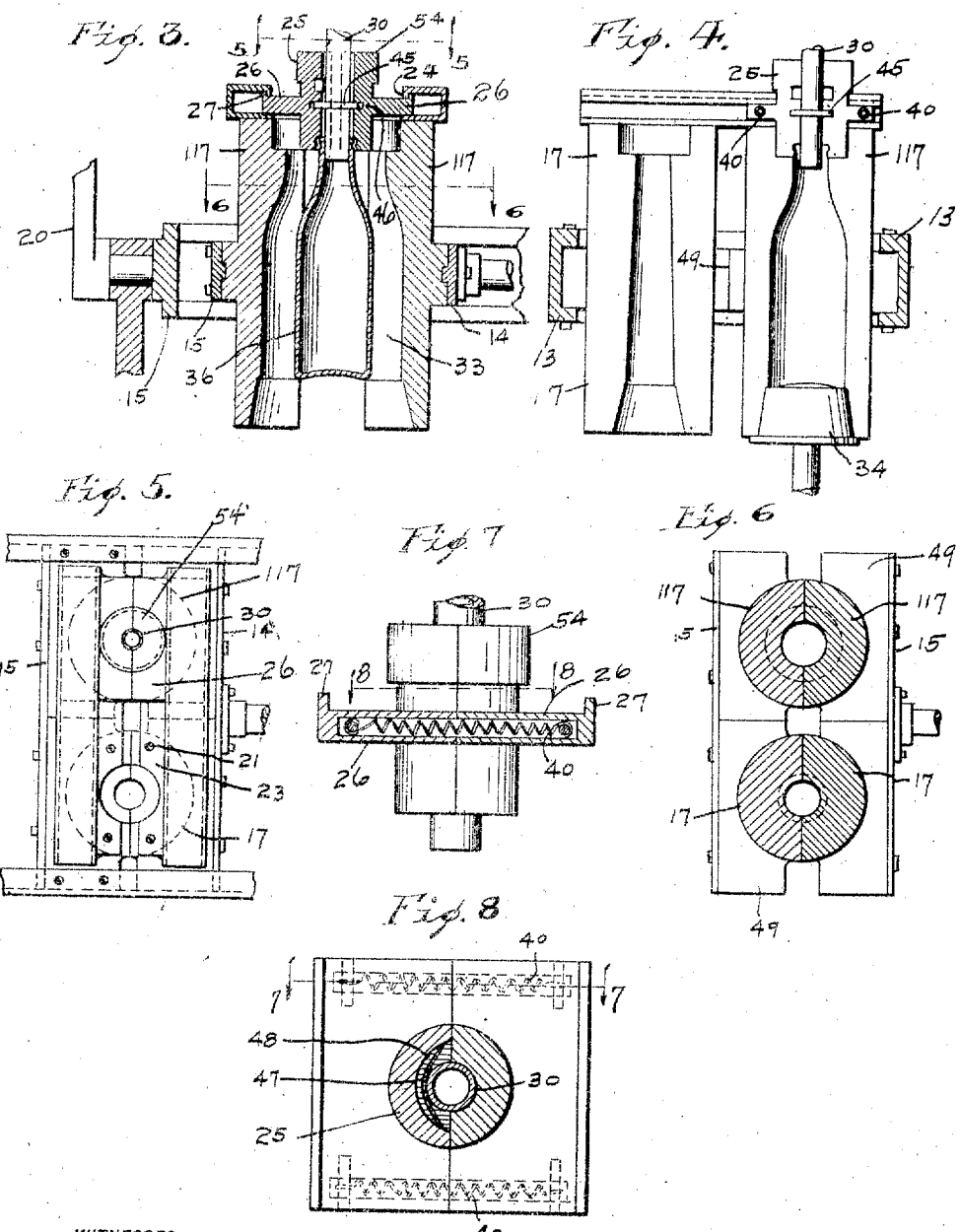

UNITED STATES PATENT OFFICE.

EDWARD S. HUTTON, OF LAPEL, INDIANA.

GLASS-MOLD.

1,253,246.

Specification of Letters Patent. Patented Jan. 15, 1918.

Application filed February 12, 1916. Serial No. 77,991.

*To all whom it may concern:*

Be it known that I, EDWARD S. HUTTON, a citizen of the United States, and a resident of Lapel, county of Madison, and State of Indiana, have invented a certain new and useful Glass-Mold; and I do hereby declare that the following is a full, clear, and exact description thereof, reference being had to the accompanying drawings, in which like letters refer to like parts.

The object of this invention is to facilitate the transfer of the glass blank from the press mold to the blow mold and without removing the blank from the mold construction so as to chill it or otherwise injure it.

The chief feature of the invention consists in associating the press mold and blow mold in a single mold construction in such manner that the corresponding halves of the press mold and the blow mold may be simultaneously separated or moved to closing position and providing a lift-over slidable or otherwise movable across the end of the mold construction, to and fro, whereby it will move the glass blank from the press mold to the blow mold and then return to position in connection with the press mold. The invention has been made with particular reference to use in glass machines such as that set forth in my former application, Serial No. 51,108, filed September 16, 1915, but the invention is not necessarily limited to use of any particular glass making machine.

Figure 1:
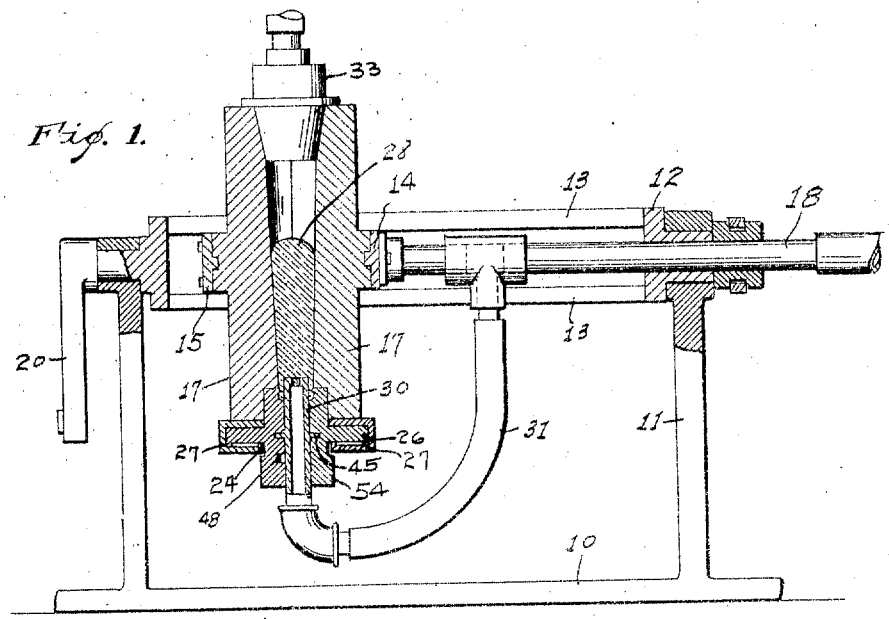
Figure 2:
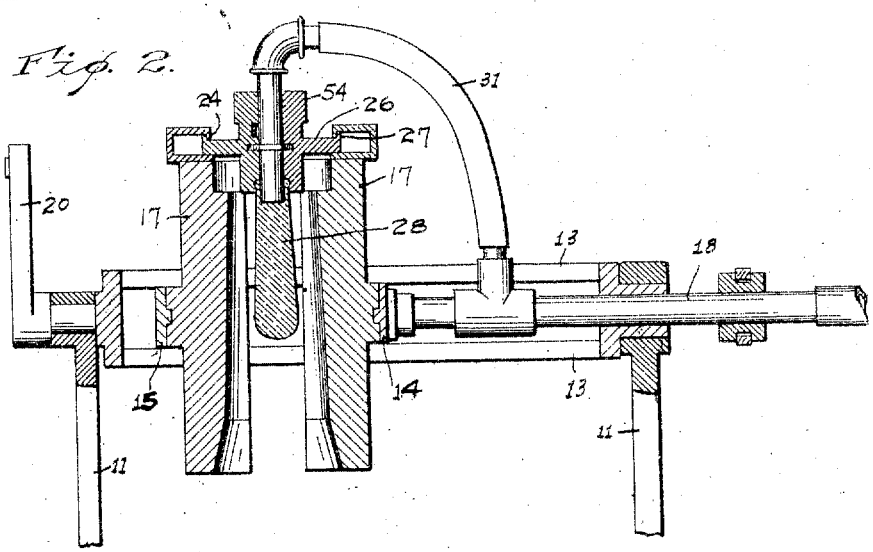

The full nature of the invention will be understood from the accompanying drawings and the following description and claims:

In the drawings, Figure 1 is a front elevation of a part of the glass blowing machine showing the invention, parts being in vertical section showing the position of the parts during the formation of the blank. Fig. 2 is a part of the same as shown in Fig. 1, with the sections of the mold separated after the blank has been formed. Fig. 3 shows a part of the mechanism in vertical section on a plane through the mold while the article is being blown, said section being parallel with that shown in Fig. 1 and the members of the blow mold being separated after the article has been blown. Fig. 4 is an inside elevation of one half of the mold with the glass blank or article removed. Fig. 5 is a plan view of the mold construction with the mold members closed. Fig. 6 is a horizontal section through the same on the line 6—6 of Fig. 3, with the glass article removed. Fig. 7 is a side elevation of the lift-over with a portion thereof in vertical section on the line 7—7 of Fig. 8. Fig. 8 is a plan view of the lift-over with a portion thereof in horizontal section on the line 8—8 of Fig. 7.

The invention is not limited to the general mechanism herein shown, but there appears here a general frame 10 with two uprights 11 which have rotatably mounted in their upper ends a rectangular frame 12 having at each side a pair of bars 13 to make a guideway for the cross frames 14 and 15, the ends of which are slidable therein. The frame 15 which carries the halves or the members 17 and 117 of the press mold and blow mold, respectively, is stationary. The frame 14 which carries the opposite halves of said molds is slidable in said guideways 13 by a tube 18 and means, not here shown, for operating said tube. The frame 12 is oscillated by a crank 20 or any other means from the position shown in Fig. 1 to that shown in Fig. 2, and the reverse. An inside elevation of one member of each mold is shown in Fig. 4. The corresponding halves of the press mold and blow mold have secured on their upper ends by screws 21 a guideway 23 extending for the full length of the mold. Said guideway is wholly rectangular and has a flange 24 extending down from the inner edge of the top, as seen in Fig. 3.

The lift-over consists of a central tubular portion 25 and a horizontal and rectangular plate-like portion 26. The edges of this latter project into the guides 23 and are held there from escape by the flanges 27 on the edges of the plate 26. When the mold sections are separated, as shown in Fig. 3, these flanges prevent the lift-over members from entirely separating from the mold members. And such arrangement enables the lift-over to be slid from one end, as shown in Fig. 2, to the other end, as shown in Fig. 4, of the mold construction, and thus transfer the blank 28 from the pressing position, as shown in Fig. 2, to the blowing position, as shown in Fig. 3. The lift-over has a blow tube 30 in it which is connected with an air tube 31 running to the tube 18 through which air under pressure is conveyed for blowing the article.

For pressing the article the mold is in the position shown in Fig. 1 with the lift-over downward and with the cavity of the press mold enlarged upward and being closed at its upper end by a blow head 33 through which air under pressure is admitted for pressing the blank, as shown in Fig. 1.

After the blank is pressed the mold is inverted to the position shown in Fig. 2 and the mold members separated as there shown, which will cause the blank 28 to be suspended from the lift-over 54. Then the lift-over is slid from the position shown in Fig. 2 to that shown in Fig. 3 which brings the blank into the blow mold. The sections of the mold are then brought together and the lower end closed by the bottom 34 being moved upwardly into place in the lower end of the mold. Upon the introduction of air through the tube 30, the article will be blown to form the blank bottle 36, as shown in Fig. 3. Then the members of the mold are separated leaving the bottle suspended, as shown in Fig. 3, whereupon it is removed.

The sections of the lift-over are held together by two springs 40, as shown in Figs. 7 and 8, which draw said sections together. The sections are separated by the separating movement of the members of the mold acting through the flanges 24 and 27 on the guides 23 and plates 26, respectively. The air tube 30 is supported on the portions 25 of the lift-over by an annular collar 45 which projects into the corresponding annular grooves 46 in the lift-over. The sections of the lift-over are separated or pushed apart for the removal of the finished bottle by the spring 47 shown in Fig. 8, which lies under tension in half of the part 25 of the lift-over. The spring 47 is weaker than the springs 40 and its function is to separate the lift-over sections from the tube 30 after the lift-over sections have been separated from each other so as to permit the movement of the bottle, the neck of which is held between said parts. After the bottle is removed the lift-over is slid back to the press mold.

As shown in Figs. 4, 5 and 6, the press mold members 17 and blow mold member 117 are made separate from each other so as to leave a vertically extending space between them, the upper ends being however secured together by the guide 23 and lateral flanges or central portions 49 extending and secured in and abutting against each other, as seen in Fig. 4. This skeleton structure of the mold members is only for the purpose of keeping the mold members as cool as possible. Otherwise, the corresponding halves of the press mold and blow mold could be in one solid piece, but they are kept cooler by having the space between them shown in Fig. 4, and are rigidly secured together by the means described.

The invention claimed is:

1. A combined press and blow mold composed of two sections movable against and away from each other and having in their adjacent faces corresponding cavities for forming a press mold and a blow mold respectively, a lift-over member slidably mounted on one end of said mold sections and with lateral flanges, and guiding means secured to the mold sections in which the edges of said lift-over member move and having flanges interlocking with the flanges on the lift-over so that the lift-over sections will not escape from the mold sections when separated.

2. A combined press and blow mold composed of two sections one of which is movable against and away from the other so as to be always parallel and having oppositely located parallel guideways on their upper ends and having in their adjacent faces corresponding cavities for forming a press mold and a blow mold respectively, and a lift-over provided with laterally extending portions projecting and operating in said guideways and interlocking therewith so that the lift-over sections cannot escape therefrom from the mold sections when separated.

3. A combined press and blow mold composed of two parallel sections movable against and away from each other and having oppositely located parallel guideways on their ends and having in their adjacent faces corresponding cavities for forming a press mold and a blow mold respectively, and a semi-circular cavity at the end of each of said press and blow molds, and a lift-over member having a central circular portion to fit in said circular cavities and plate-like extensions projecting and operating in said guideways, said lift-over and guideways having interlocking flanges which prevent the lift-over sections from escaping from the mold sections when separated.

4. A combined press and blow mold composed of two parallel sections movable against and away from each other and having oppositely located parallel guideways on their ends and having in their adjacent faces corresponding cavities for forming a press mold and a blow mold respectively and a semi-circular cavity at the end of each of said press and blow molds, a lift-over formed of two halves, each half having a central semi-circular portion adapted to fit in the semi-circular cavity in the mold sections, a plate-like extension projecting into the guideways, and springs tending to hold the portions of said lift-over together.

5. In a glass making machine, a frame having a pair of oppositely located guides, a pair of transversely extending mold sections mounted on said guides so that said mold sections may be slidably united and separated and having in their adjacent faces corresponding cavities for forming a press mold and a blow mold respectively, a lift-over formed of sections slidably mounted on one end of said mold sections which permits the mold sections to be moved against or away from each other and whereby the blank can be transferred from between the mold sections, springs tending to hold the sections together, and a spring located in one mold section for pushing out the bottle therefrom when the other mold section is moved away from the bottle.

In witness whereof, I have hereunto affixed my signature.

EDWARD S. HUTTON.